INVENTOR
Stanley W. Ensminger
BY Connolly and Hutz
ATTORNEYS

United States Patent Office 3,313,693
Patented Apr. 11, 1967

3,313,693
ANTIBIOTICS RECOVERY PROCESS EMPLOYING RESINS AND HORIZONTAL FLOW
Stanley W. Ensminger, Waterford, Conn., assignor to Chas. Pfizer & Co., Inc., New York, N.Y., a corporation of Delaware
Filed Jan. 16, 1962, Ser. No. 166,502
8 Claims. (Cl. 167—65)

This invention relates to the recovery of basic antibiotics from solution and, more particularly, to an improved process for the recovery of antibiotics from fermentation broths in which they are formed.

The antibiotics to which this invention relates, the so-called basic antibiotics, are characterized by the presence of basic nitrogen groups as, for example, the guanidino group. These antibiotics, typical examples of which are streptomycin, neomycin, viomycin and polymixin are formed in fermentation media containing organic and inorganic substances which, if they are not removed during recovery operations, tend to reduce the potency of the antibiotics, add to their color, and interfere in subsequent processes such as crystallization. A particularly useful procedure for isolation and purification of basic antibiotics comprises adsorption of the antibotic from a fermentation broth onto a particulate synthetic cation-exchange resin, washing said antibiotic-resin adsorbate until a substantial amount of the impurities are removed and then eluting the antibiotic with dilute acid. The purified antibiotic is then recovered from the eluate by well-known procedures such as precipitation, and the like.

The aforesaid adsorption of basic antibiotics onto ion exchange resins has up to now been carried out by two techniques. These are referred to as either "batch" processes or "fixed-bed" processes. "Batch" processes involve suspending the antibiotic-containing broth in a suitable vessel as, for example, a kettle, and treating said broth with a cation-exchange resin until such time as the antibiotic is adsorbed on the resin, separating the spent or depleted broth from the resin as by filtration or decantation then desorbing the antibotic with dilute acid. The term "fixed-bed" as it is generally applied to ion-exchange processes means utilization of a packed column of stationary or static resin to process a solution in a cyclic manner. Purifying antibiotics in a fixed-bed process comprises passage of an antibiotic broth through a stationary bed of cation-exchange resin confined in a tower during which the antibiotic is adsorbed, the depleted broth leaving the tower, and then the purified antibiotic is desorbed with acid.

The new process contemplated by the present invention is, as will be shown clearly by the discussion to follow, considered to be neither fixed-bed nor batch type in nature. It comprises flowing an impure solution of basic antibiotic in a substantially horizontal direction through a freely-suspended particulate cation exchange resin until removal of the antibiotic from the impure solution by the said resin substantially ceases, and then separating the antibiotic-depleted solution from the resin adsorbate, said resin being present in a proportion of from about 0.1 to about 0.8 volume per volume of solution in the trough.

Batch processes, because of their nature, tend to require rather large sized equipment to process solutions of basic antibiotics at the very low concentrations encountered in fermentation broths. This disadvantage is inherent in the operation of batch processes since suitably large vessel capacity must be available to contain all of the antibiotic broth together with enough ion-exchange resin to remove the contained antibiotics therefrom.

Use of the aforesaid fixed-bed process in a tower operation has tended to overcome disadvantages inherent in the batch process since large volumes of dilute antibotic solutions can generally be handled in smaller plant installations. On the other hand, purification of antibotics in fixed-bed processes are subject to several serious disadvantages. For example, there is a tendency for the fixed-bed to become plugged due to contamination by bacterial action; this has the effect of removing zones of resin from the stream and necessitates shutdown of the process until such plugging is relieved. In addition, channels are frequently formed in fixed-beds and these lead to serious losses in adsorption efficiency. Another and particularly serious problem with fixed-bed operation is the inability to readily remove antibiotics from "whole" fermentation broths, that is, from unfiltered broths obtained directly from the fermentation vessels. Said whole fermentation broths ordinarily contain solid particles of mycelium and are so viscous that they must be diluted before passage through a fixed-bed and even after dilution plugging of the bed with particles and stoppage are encountered with great frequency.

The aforesaid disadvantage inherent in fixed-bed operation in towers may be partially overcome in several ways and, in fact, there have been recently disclosed two processes for removing antibiotics from unfiltered fermentation broths. In U.S. Patent No. 2,786,831, for example, it is disclosed that a whole broth can be fed to a tower of resin in which a suitably sized screen is used to retain the resin while allowing the broth solids to pass out of the tower. In another expediential modification of a fixed-bed process (disclosed in abandoned application, Ser. No. 6,504, filed Feb. 3, 1960), a series of vanes on a concentrically rotating shaft is used to churn the resin and the broth is passed in an upward direction through the tower at a velocity which falls between the settling rate of the resin particles and the settling rate of the broth solids. It has been found, however, that the use of separating screens as disclosed by the first-mentioned process is attended by instances of blockage by broth solids requiring the use of periodic or continous scraping or similar expedients to clear them. Furthermore, if screens are obviated by use of an agitator and a properly selected flow rate as is disclosed in the second-mentioned process, although a substantial improvement in process efficiency is obtained, there is a tendency for the agitator shaft bearings to be forced out of line and to require periodic maintenance. Both of the above modified processes still suffer disadvantages common to all fixed-bed processes. For example, there remains a tendency in both processes for the feed liquor to channel through unagitated portions of the resin; visual observation of the internal action is not easily maintained since even glass panels when used immediately become obscured by stationary areas of resin; the manner of operation of a tower requires equipment designed to withstand pressure and this requires relatively heavy materials of construction; operation under pressure in a tower is attended by leaks developing in piping, agitator stuffing boxes and pump glands; and towers because of their shape are relatively difficult to unload during the changeover from one product to another.

It has now surprisingly been found that if the process contemplated by the instant invention is employed, all of the above mentioned disadvantages of both batch and fixed-bed processes are obviated and, furthermore, that whole broths can be treated in a particularly efficient manner in plant installations of approximately the same capacity as when towers are used. It has now been found that if the ion exchange resin particles are maintained in a freely-suspended state in a horizontally flowing stream of antibiotic-containing solution there is no possibility for the broth to channel through unagitated portions of the resin. Furthermore, the use of a trough, which is one of the embodiments of the present invention, allows the resin to be observed over the entire length of the unit and said unit can be operated at atmospheric pressure with less tendency for leaks to develop at critical points. In addition, maintenance is minimized and simplified since all parts are readily observable and very accessible. A still further advantage of the present invention is that loading or unloading of the resin from a trough is much easier than from a tower thus simplifying the changeover from one product to another.

In contrast to the aforementioned prior art tower operations with fixed-beds or which, as in the case of the aforesaid copending application (Ser. No. 6,504, filed Feb. 3, 1960), employ in expediential modification a gently churned bed of resin, the instant invention contemplates the use not of a bed but of a freely-suspended resin. By freely-suspended, it is meant that substantially all of the particles are maintained separated from one another when in contact with the broth. The most important factors in achieving this state, that is, in maintaining minimum contact between particles, have been found to be the degree of agitation employed and the ratio of volume of resin particles to the volume of the contacting broth. Of course, it is obvious that other factors such as the respective specific gravities of the broth and of the resin influence the achievement of the freely-suspended state.

The new process will be better understood by reference to the following drawing in which.

Figure 1:
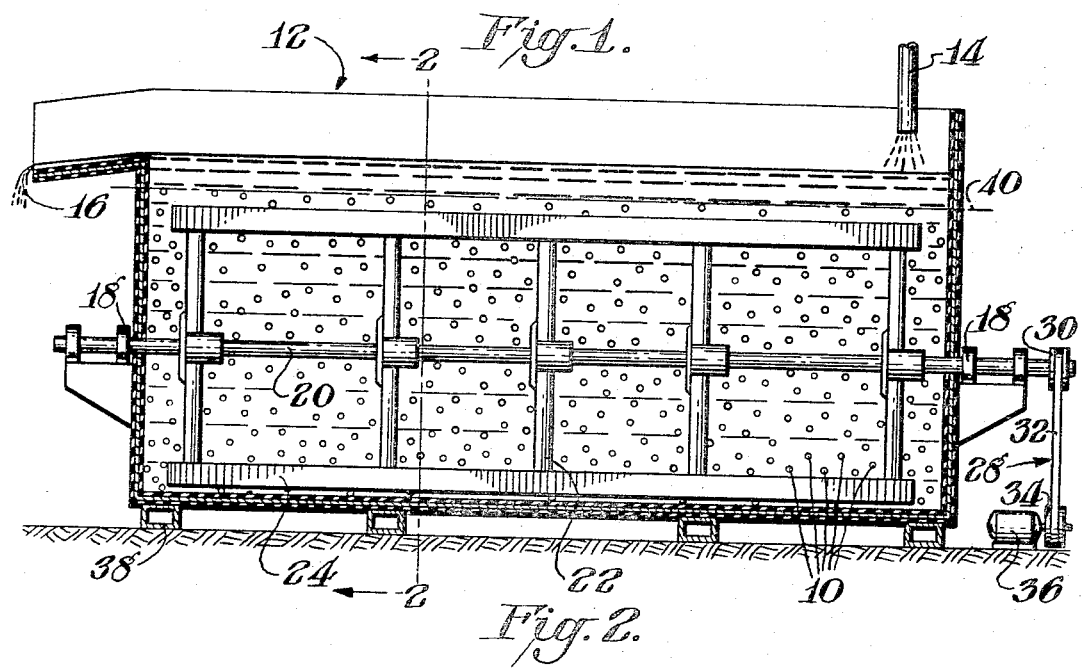
FIG. 1 is a view in elevation of one embodiment of the invention.
Figure 2:
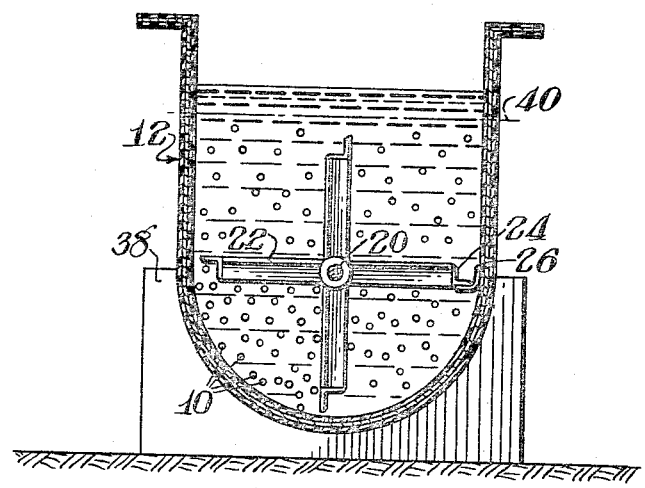
FIG. 2 is a view in cross-section taken through FIG. 1 along the line 2—2 and looking in the direction of the arrows.

A volume of cation-exchange resin 10 is confined within trough 12 fabricated of conventional material, suitably rubber-covered steel. The trough is mounted on conventional supports 38. Streptomycin-containing broth, adjusted if necessary to a substantially neutral pH, preferably a pH between about 7 and about 8, is pumped into one end of the trough through inlet port 14. The broth passes in a substantially horizontal direction through the trough, being discharged at overflow 16. To maintain the resin in a freely-suspended state in the flowing broth, a shaft 20 is mounted concentrically within trough 12 through bearings 18. Shaft 20 carries a plurality of impelling vanes 24 each attached to it through radially extending brackets 22. Suitably four impeller blades are used as is illustrated. One of the blades is fitted with rubber wiper 26. Shaft 20 is turned by a conventional drive 28, which may comprise a motor 36 whose rotation is transmitted to the shaft 20 by belt 32 and sheave 30. Impelling vanes 24 sweep through the resin bed causing the particles to become freely-suspended in the flowing broth and permitting intimate contact of said resin with the broth. The one rubber wiper blade 26 tends to prevent agglomeration of the resin the lowest part of the trough, and line 40 indicates the approximate resin level when impelling vanes 24 are in operation. As the broth flows through the trough and is brought into contact with the freely-suspended resin particles the antibiotic content is depleted by adsorption on said particles and the spent broth overflows from the end of the trough carrying with it the solid broth impurities (which have a lower specific gravity than does the resin-antibiotic adsorbate).

After the desired volume of broth has been passed through the trough, the residual liquor is displaced by introducing water through the inlet pipe 14 whereupon the resin adsorbate is ready for elution of the antibiotic in a conventional manner, as for example, by passing an aqueous solution of mineral acid through the freely-suspended resin.

In the practice of the instant invention the resin will be a particulate synthetic cross-linked cation-exchange resin, preferably one having a particle size of about 100 mesh or coarser, on the U.S. Standard Sieve scale, and having a specific gravity in excess of about 1.0.

Suitable resins are well known in the antibiotic recovery art and have been widely described in the literature. They include those resins which derive their cation-exchange capacity from sulfonic acid groups, such as resins prepared by copolymerizing styrene with a minor proportion of divinylbenzene and subsequently sulfonating with concentrated sulfuric acid as described, for example, in U.S. Patent 2,366,007. However, it is particularly preferred in recovering streptomycin and other basic antibiotics to employ resins which derive their ion-exchange capacity from carboxylic groups. Such resins are commercially available and a suitable example is the resin commercially known as Amberlite IRC–50, available from Rohm & Haas Company, of Philadelphia. They are described in detail in U.S. Patent 2,340,111. Other suitable carboxylic resins may be prepared by copolymerizing a mono-unsaturated carboxylic acid and the cross-linking agent, that is, a compound having a polymerizable terminal methylene group and at least one other polymerizable grouping. Among the appropriate carboxylic acids are acrylic, alpha-alkylacrylic, and itaconic acids. Examples of suitable cross-linking agents include divinylbenzene, ethylene glycol dimethacrylate, allyl methacrylate, butadiene, allyl maleate, and the like. In some cases it may be convenient to copolymerize the unsaturated carboxylic acid in the form of an ester or anhydride and to hydrolyze the resulting copolymer, but where the cross-linking agent contains a hydrolyzable ester group such procedure will usually not be practical. The copolymers of acrylic or methacrylic acid with divinylbenzene are ordinarily preferred because of their ready availability and excellent stability. The concentration of divinylbenzene employed is not critical. However, for optimum physical properties, resins prepared from polymerization mixtures containing at least about 1 percent divinylbenzene are to be selected and for efficient utilization of resin capacity a level not exceeding about 10 percent divinylbenzene is preferred. Resins prepared at even higher divinylbenzene concentrations may be utilized, but their capacity for streptomycin and other antibiotics will be lower. Particularly preferred are the copolymers of acrylic or methacrylic acid with about 2 to 8 percent divinylbenzene. The resin may be in the free acid form but it is preferred that it be employed in the form of a salt, particularly a salt formed with a monovalent cation. The resin may, for example, be employed in the sodium or ammonium cycle.

It is an essential embodiment of the instant invention that the flow of antibiotic solution be in a substantially horizontal direction. While not essential to the present invention, the preferred vessel is a trough or conduit. The particulate resin may be maintained in a freely-suspended state within the confines of a vessel in which the longitudinal dimensions exceed the height and width although any combination of length, width and height may be used so long as the antibiotic-containing solution is able to flow in a substantially horizontal manner. Although the vessel has been so designed that flow through it has been by gravity, that is, the discharge end has been located so that it is somewhat lower than the end at which broth is introduced and movement of the antibiotic solution through the freely-suspended resin is promoted by the process of overflowing at the lower discharge end, other means can be used to cause the broth to flow as with a pump, or the like. A paddle type agitator can be provided and is preferred to maintain the resin in a freely-suspended state, although other means can be employed such as by blowing gas through the suspension, by the use of vibrators and the like. By practicing the process of the instant invention in an agitated trough-type vessel, the antibiotic-containing broth flowing in at the higher, entrance end becomes depleted of antibiotic during contact with the freely-suspended resin and the depleted broth flows out under the influence of gravity at the lower discharge end.

Alternatively, the instant invention can be carried out in a rotating drum apparatus. That is, the antibiotic-containing broth is introduced into one end of a rotating drum containing a quantity of freely-suspended resin and is caused to flow in a substantially horizontal direction through said drum. During passage of the broth through the apparatus the antibiotic is adsorbed by the resin and the depleted broth and solid broth impurities pass out of the vessel. The antibiotic is then eluted by treatment of the adsorbate with acid solution.

As has been mentioned before, in the practice of this invention it is critical to maintain the resin in a freely-suspended state. This is most readily accomplished if the resin volume-solution volume ratio in the vessel is maintained within the limits of about 0.1 to about 0.8 volume of resin per volume of solution. If said ratio exceeds the upper limit there is a tendency for the resin to form too thick a slurry to be easily contacted by the antibiotic-containing solution. If, on the other hand, the ratio falls below about 0.1 volumes of resin per volume of solution, the solution is not generally efficiently contacted by the resin and the time required for complete removal of the antibiotics is necessarily increased. It is preferred to operate at a ratio between the limits mentioned, and ratios especially preferred are in the range of about 0.2 to about 0.5 volume of resin per volume of antibiotic solution in the vessel.

As has been mentioned before, the means employed for maintaining the resin in a freely-suspended state are not critical and can comprise, for example, mechanical, ultrasonic or gas bubble agitation. However, it is preferred to use a mechanical-type agitation. While there appears to be no limit to the upper range or degree of agitation, certain difficulties are introduced if the agitation falls below a certain level. It has been found, for example, that degrees of agitation below certain limits permit the resin to settle to the bottom of the vessel and when the resin is no longer freely-suspended, the adsorption capacity of the resin for the antibiotic decreases substantially. This said lower limit has been found to be particularly dependent upon specific gravity of the resin and the viscosity of the antibiotic broth being treated.

Another variable which has an effect upon the efficiency of the process of the instant invention but is not critical to its application is the rate of flow of the antibiotic-containing solution through the freely-suspended resin. It has been found if the rate exceeds a certain limit the antibiotic tends to "break-through" and is not completely adsorbed before the broth passes out of contact with the freely-suspended resin; on the other hand, if the rate of flow is too slow, consequences are less serious although the process is not being operated at optimum efficiency.

It is to be understood that the present invention contemplates, in addition to use of a single apparatus, the use of a plurality of vessels. In fact, in one of the most desirable embodiments (which will be exemplified hereinafter), two or more vessels are connected in series, the overflow from the first vessel being pumped to the inlet end of the second vessel, and so on through the series. It is found that when the system is operated in this manner the effluent from the last vessel is essentially free of antibiotic content and, in comparison with single vessel operation, relatively higher flow rates can be used without potency break-through.

Among the antibiotics which may be purified by the present process are streptomycin, neomycin, viomycin, polymixin, dihydrostreptomycin, hydroxstreptomycin, streptothricin, mannosidostreptomycin, and others of this nature. These all contain highly basic groups, such as guanidino groups and they may be purified with unexpected ease by the process of the present invention.

The following examples are given by way of illustration, and are not to be regarded as limitations of this invention, many variations of which are possible without departing from its spirit or scope.

*Example I*

A mixture of methacrylic acid with 5 percent divinylbenzene is polymerized by adding 1 percent benzoyl peroxide catalyst and heating in a closed vessel at 60 degrees C. for 24 hours. The resulting polymer is ground to fine particle size, washed with 8 percent aqueous sodium hydroxide, rinsed with water and screened to a mesh range of about 14 to 45 on the U.S. Standard Sieve scale. The screened resin is treated with 3 volumes of 2 N hydrochloric acid and water washed.

*Example II*

Three horizontal troughs 12 ft. long by 4.5 ft. wide by 6 ft. deep (2,000 gal. volume) connected in series are each charged with 3000 lbs. of carboxylic cation-exchange resin prepared as described in Example I. Each trough is provided with a horizontally orientated rotatable axial shaft to which is affixed four blades parallel to said shaft, each equidistant from one another and from said shaft, each fastened to said shaft by means of five brackets of such length so as to provide a close clearance of about one inch between the blade and the bottom of said trough, and one of the blades provided with a rubber wiping means of sufficient width to contact said trough bottom, capable of maintaining the ion exchange resin in a freely-suspended state. The resin is converted to the sodium ion-form by charging the last trough in the series with 1500 gallons of 10 percent sodium hydroxide solution, pumping the solution through the system while the resin is maintained in a freely-suspended state and discarding the effluent. Water is then passed through the system until the pH of the effluent has fallen to below about 11. The resin in each trough which originally occupied a volume of about 500 gallons in the hydrogen ion-form now occupies about 900 to 1000 gallons.

Filtered streptomycin-containing fermentation broth adjusted to pH 7 to 8 with 10 percent sodium hydroxide solution is then pumped into the first trough in the series at a rate of about 30 gallons per minute with slow agitation to maintain the resin in a freely-suspended state, the overflow from the first trough is pumped to the feed inlet of the second trough, and so on, through the system. Introduction of the streptomycin-containing broth to the first trough in the series is continued until analysis shows that the antibiotic activity of the effluent from this trough is equal to that of the broth introduced whereupon this trough is cut out of the system. The freely suspended resin saturated with streptomycin in the first trough is now washed until it is free of residual broth with 25,000 gallons of water and the effluent is discarded. To elute the antibiotic, the trough is filled with 2 N sulfuric acid and the displaced streptomycin is removed by displacement with 2 to 3 additional volumes of water. The eluate is neutralized and is further treated to recover the streptomycin in a form for therapeutic administration.

Each of the subsequent troughs in the series are saturated with streptomycin and eluted with acid in the manner as described for the first trough. After the first trough is eluted, it is again regenerated with 1500 gallons of 10% aqueous sodium hydroxide and becomes the final trough in the subsequent adsorption run.

*Example III*

The procedure as outlined in Example II is repeated substituting for the filtered broth, a relatively viscous streptomycin-containing whole broth. This broth has previously been screened through a 40-mesh sieve to remove relatively coarse particles of mycelium. Substantially the same results are obtained.

*Example IV*

The procedure of Example II is repeated substituting neomycin-containing whole fermentation broth previously screened through a 40-mesh sieve for the streptomycin-containing broth. Substantially the same result is obtained.

The procedure of Example II is repeated substituting viomycin-containing whole fermentation broth pre-screened through a 40-mesh sieve for the streptomycin-containing broth. Substantially the same results are obtained.

The procedure of Example II is repeated substituting polymixin-containing whole fermentation broth pre-screened through a 40-mesh sieve for the streptomycin-containing broth. Substantially the same results are obtained.

What is claimed is:

1. A process for adsorbing a basic antibiotic upon a particulate carboxylic acid-type cation-exchange resin which comprises flowing an impure solution of said antibiotic in a substantially horizontal direction through a free suspension of said resin until the adsorption of the antibiotic content of said solution by said resin substantially ceases and then separating the antibiotic-depleted solution from the resin adsorbate, said resin being present in a proportion of from about 0.1 to about 0.8 volume per volume of solution in the vessel confining said resin.

2. A process as in claim 1 wherein the solution is an unfiltered whole fermentation broth.

3. A process as in claim 1 wherein said basic antibiotic is streptomycin.

4. A process as in claim 1 wherein said basic antibiotic is neomycin.

5. A process as in claim 1 wherein said basic antibiotic is polymixin.

6. A process as in claim 1 wherein said basic antibiotic is viomycin.

7. A process as in claim 1 wherein said resin derives its ion-exchange capacity from carboxylic groups in the form of a monovalent cation salt thereof.

8. A process according to claim 1 wherein said solution of basic antibiotic is introduced to said free suspension of resin at a pH of from about 7 to about 8.

References Cited by the Examiner

UNITED STATES PATENTS

| | | | |
|---|---|---|---|
| 2,528,188 | 10/1950 | Taylor | 167—72 |
| 2,541,420 | 2/1951 | Howe | 167—72 |
| 2,667,441 | 1/1954 | Nager. | |
| 2,754,295 | 7/1956 | Fardig | 167—72 |
| 2,786,831 | 3/1957 | Bartels | 167—72 |
| 2,793,978 | 5/1957 | Wachtel. | |

SAM ROSEN, *Primary Examiner.*

JULIAN S. LEVITT, *Examiner.*